US009311390B2

(12) United States Patent
Higgins

(10) Patent No.: US 9,311,390 B2
(45) Date of Patent: Apr. 12, 2016

(54) SYSTEM AND METHOD FOR HANDLING THE CONFOUNDING EFFECT OF DOCUMENT LENGTH ON VECTOR-BASED SIMILARITY SCORES

(75) Inventor: Derrick C. Higgins, Philadelphia, PA (US)

(73) Assignee: Educational Testing Service, Princeton, NJ (US)

(*) Notice: Subject to any disclaimer, the term of this patent is extended or adjusted under 35 U.S.C. 154(b) by 1722 days.

(21) Appl. No.: 12/362,380

(22) Filed: Jan. 29, 2009

(65) Prior Publication Data

US 2009/0190839 A1     Jul. 30, 2009

Related U.S. Application Data

(60) Provisional application No. 61/024,303, filed on Jan. 29, 2008.

(51) Int. Cl.
*G06F 7/00* (2006.01)
*G06F 17/30* (2006.01)

(52) U.S. Cl.
CPC .................................. *G06F 17/3069* (2013.01)

(58) Field of Classification Search
CPC .............................. G06F 17/30; G06F 17/3069
USPC .................................................. 707/749–750
See application file for complete search history.

(56) References Cited

U.S. PATENT DOCUMENTS

| | | | |
|---|---|---|---|
| 5,652,713 A * | 7/1997 | Chandler | 702/190 |
| 5,867,811 A | 2/1999 | O'Donoghue | |
| 5,909,680 A | 6/1999 | Hull | |
| 6,263,121 B1 | 7/2001 | Melen et al. | |
| 6,990,628 B1 | 1/2006 | Palmer et al. | |
| 7,058,650 B2 * | 6/2006 | Yang et al. | 707/700 |
| 7,076,485 B2 | 7/2006 | Bloedorn | |
| 7,440,946 B2 | 10/2008 | Bloedorn | |
| 7,472,121 B2 | 12/2008 | Kothari et al. | |
| 2002/0152208 A1 | 10/2002 | Bloedorn | |
| 2003/0216870 A1 * | 11/2003 | Wolber et al. | 702/27 |
| 2005/0060643 A1 | 3/2005 | Glass et al. | |

(Continued)

OTHER PUBLICATIONS

Amit et al, "Pivoted Document Length Normalization", National Science Foundation, pp. 1-9; http://singhal.info/pivoted-dln.pdf.*

(Continued)

*Primary Examiner* — Mariela Reyes
*Assistant Examiner* — Linh Black
(74) *Attorney, Agent, or Firm* — Jones Day

(57) ABSTRACT

A computer-implemented method, system, and computer program product for generating vector-based similarity scores in text document comparisons considering confounding effects of document length. Vector-based methods for comparing the semantic similarity between texts (such as Content Vector Analysis and Random Indexing) have a characteristic which may reduce their usefulness for some applications: the similarity estimates they produce are strongly correlated with the lengths of the texts compared. The statistical basis for this confound is described, and suggests the application of a pivoted normalization method from information retrieval to correct for the effect of document length. In two text categorization experiments, Random Indexing similarity scores using pivoted normalization are shown to perform significantly better than standard vector-based similarity estimation methods.

6 Claims, 6 Drawing Sheets

(56) References Cited

U.S. PATENT DOCUMENTS

| | | | |
|---|---|---|---|
| 2005/0143971 A1 | 6/2005 | Burstein et al. | |
| 2006/0286540 A1 | 12/2006 | Burstein et al. | |
| 2006/0294101 A1 | 12/2006 | Wnek | |
| 2007/0038384 A1* | 2/2007 | Kirk et al. | 702/19 |
| 2008/0114750 A1 | 5/2008 | Saxena et al. | |
| 2008/0114754 A1* | 5/2008 | Karasudani et al. | 707/5 |
| 2008/0261516 A1* | 10/2008 | Robinson | 455/3.06 |
| 2009/0037389 A1 | 2/2009 | Kothari et al. | |
| 2010/0049760 A1* | 2/2010 | Rousseau et al. | 707/692 |
| 2010/0138452 A1* | 6/2010 | Henkin et al. | 707/803 |

OTHER PUBLICATIONS

Apté, C.; Damerau, F.; and Weiss, S. M. 1994a. Automated learning of decision rules for text categorization. ACM Trans. Inf. Syst. 12(3):233-251.

Apté, C.; Damerau, F.; and Weiss, S. M. 1994b. Towards language independent automated learning of text categorization models. In SIGIR '94: Proceedings of the 17th annual international ACM SIGIR conference on Research and development in information retrieval, 23-30. New York, NY, USA: Springer-Verlag New York, Inc.

Attali, Y., and Burstein, J. 2006. Automated essay scoring with e-rater v.2. The Journal of Technology, Learning and Assessment (JTLA) 4(3).

Cardoso-Cachopo, A., and Oliveira, A. L. 2003. An empirical comparison of text categorization methods. In SPIRE 2003-Tenth Symposium on String Processing and Information Retrieval, LNCS, 183-196. Springer-Verlag.

Davidov, D.; Gabrilovich, E.; and Markovitch, S. 2004. Parameterized generation of labeled datasets for text categorization based on a hierarchical directory. In Proceedings of the 27th annual international Conference on Research and Development in Information Retrieval., 250-257.

Deerwester, S. C.; Dumais, S. T.; Landauer, T. K.; Furnas, G. W.; and Harshman, R. A. 1990. Indexing by latent semantic analysis. Journal of the American Society of Information Science 41(6): 391-407.

Gabrilovich, E., and Markovitch, S. 2004. Text categorization with many redundant features: using aggressive feature selection to make svms competitive with c4.5. In ICML '04: Proceedings of the twenty-first international conference on Machine learning, 41. New York, NY, USA: ACM.

Higgins, D. 2007. Sentence similarity measures for essay coherence. In Proceedings of the seventh international workshop on computational semantics (IWCS-7).

Kanerva, P.; Kristoferson, J.; and Holst, A. 2000. Random indexing of text samples for latent semantic analysis. In Gleitman, L. R., and Josh, A. K., eds., Proc. 22nd Annual Conference of the Cognitive Science Society.

Landauer, T. K., and Dumais, S. T. 1997. A solution to Plato's problem: The latent semantic analysis theory of acquisition, induction, and representation of knowledge. Psychological Review 104:211-240.

Lewis, D. 2007. Reuters-21578 text categorization collection, distribution 1.0, daviddlewis.com/resources/testcollections/reuters21578/.

Quinlan, J. 1996. Improved use of continuous attributes in C4.5. Journal of Artificial Intelligence Research 4:77-90.

Sahlgren, M. 2001. Vector based semantic analysis: Representing word meanings based on random labels. In Proceedings of the ESSLLI 2001 Workshop on Semantic Knowledge Acquisition and Categorisation.

Sahlgren, M. 2006. The Word-Space Model: Using distributional analysis to represent syntagmatic and paradigmatic relations between words in high-dimensional vector spaces. Ph.D. Dissertation, Stockholm University.

Singhal, A.; Buckley, C.; and Mitra, M. 1996. Pivoted document length normalization. In Research and Development in Information Retrieval, 21-29.

International Search Report of PCT Application No. PCT/2009/032475, Mar. 20, 2009, 2 pages.

Singhal et al. "Pivoted Document Length Normalization". In Proceedings of the 19th annual international ACM SIGIR conference on Research and development in information retrieval. Published Aug. 18, 1996. [retrieved on Apr. 5, 2009]. Retrieved from the Internet: <URL: http://kur2003.ititb.acidifile/singhal96pivoted.pdf > entire document, especially Abstract; p. 2, para 5; p. 3, para 2-3; p. 4, pare 1-3; p. 6, para 7.

Singhal et al. Citation: "Pivoted Document Length Normalization". In Proceedings of the 19th annual International ACM SIGIR conference on Research and development in information retrieval. Published Aug. 18, 1996. [retrieved on Apr. 5, 2009]. Retrieved from the Internet: <URL: http://portaLacm.org/toc.cfm?id=243199&type=proceeding&coll=GUIDE &dl=GUIDE&CFID=24933933&CFTOKEN=56093174 >.

Baayen, R. Harald; Word Frequency Distributions; vol. 18 of Text, Speech and Language Technology; Kluwer Academic Publishers; 2001.

Burstein, Jill; The E-rater Scoring Engine: Automated Essay Scoring with Natural Language Processing; In M. D. Shermis and J. C. Burstein (Eds.), Automated Essay Scoring: A Cross-Disciplinary Perspective; Lawrence Erlbaum Associates; Hillsdale, NJ; Chapter 7; pp. 113-121; 2003.

Landauer, Thomas, Laham, Darrell, Foltz, Peter; Automated Scoring and Annotation of Essays with the Intelligent Essay Assessor; In M. D. Shermis and J. C. Burstein (Eds.), Automated Essay Scoring: A Cross-Disciplinary Perspective; Lawrence Erlbaum Associates; Hillsdale, NJ; Chapter 6; pp. 87-112; 2003.

Liu, Yun-Feng, Qi, Huan, Hu, Xiang-En, Cai, Zhi-Qiang, Dai, Jian-Min, Zhu, Li; Application of LSA Space's Dimension Character in Document Multi-Hierarchy Clustering; Proceedings of the 4th International Conference on Machine Learning and Cybernetics; pp. 2384-2389; 2005.

Page, E.B.; The Use of the Computer in Analyzing Student Essays; International Review of Eduation, 14(2); pp. 210-225; 1968.

Penumatsa, Phanni, Ventura, Matthew, Graesser, Arthur, Franceschetti, Donald, Louwerse, Max, Hu, Xiangen, Cai, Zhiqiang; The Right Threshold Value: What is the Right Threshold of Cosine Measure when Using Latent Semantic Analysis for Evaluating Student Answers?; International Journal of Artificial Intelligence Tools, 15(5); pp. 767-778; 2006.

Salton, Gerard, McGill, Michael; Introduction to Modern Information Retrieval; McGraw Hill: New York; 1983.

Witten, Ian, Frank, Eibe; Data Mining: Practical Machine Learning Tools and Techniques, Second Edition; Morgan Kaufmann Series in Data Management Systems; 2005.

\* cited by examiner

SYSTEM AND METHOD FOR HANDLING THE CONFOUNDING EFFECT OF DOCUMENT LENGTH ON VECTOR-BASED SIMILARITY SCORES

CROSS-REFERENCE TO RELATED APPLICATIONS

This application claims priority to provisional application U.S. Ser. No. 61/024,303 similarly entitled and filed on Jan. 29, 2008, which is incorporated by reference in its entirety.

FIELD OF THE INVENTION

This invention relates to automated text document comparison, as for example in grading essays on educational assessments.

BACKGROUND

The Confound of Document Length in Semantic Similarity Calculation

A number of statistical methods have been developed for evaluating the semantic similarity between documents by representing each document as a vector $\vec{d}$ in a vector space, and defining similarity, or semantic relatedness, as some function $\text{sim}(\vec{d}_1, \vec{d}_2)$ of the vectors corresponding to two documents. Often, this similarity metric may be the cosine of the angle between the two vectors $$\left( \text{defined as } \frac{\vec{d}_1 \cdot \vec{d}_2}{\|\vec{d}_1\| \|\vec{d}_2\|} \right),$$

but other measures (such as the city block metric, or the Euclidean distance) are used as well.

The most basic vector-based method for evaluating the semantic similarity between documents is content-vector analysis (CVA) (Salton & McGill 1983), in which one component of the document vector corresponds to each word which is considered as potentially occurring within it, and the non-zero elements of the vector contain a weighted function of the count with which a particular word occurs in the document. Other vector-space techniques, including Latent Semantic Analysis (LSA) (Deerwester et al. 1990; Landauer & Dumais 1997) and Random Indexing (RI) (Kanerva, Kristoferson, & Holst 2000; Sahlgren 2001; 2006), use dimensionality reduction to assign related words similar representations in the vector space.

One aspect of these vector-space semantic similarity estimates which has so far received little attention in the literature surrounding them is their dependence on the length of the texts to be compared. Baayen (2001) demonstrated that many estimates of lexical diversity (such as type-token ratio) are not invariant as the length of the text considered changes, and document length has a similar confounding effect on vector-based similarity scores. Two simple experiments will demonstrate this effect.

The first demonstration involves texts from the Lexile collection, a set of general fiction titles spanning a wide range of grade-school reading levels, which the author's institution licenses from the Metametrics Corporation. 400 documents were selected randomly from this collection, and truncated so that 100 included only the first 500 word tokens, 100 included only the first 1000 words, 100 included only the first 5000 words, and the final 100 included only the first 10,000 words. Two sets of similarity scores were calculated for each pair of documents in this collection (excluding duplicates).

The first set of similarity scores was created using a simple CVA model with tf*idf weighting, with log term weights and an inverse document frequency term equal to log $$\left( \frac{NDocs}{DocFreq_k} \right)$$

for each term k, where the document frequency estimates were derived from the TASA corpus of high school level texts on a variety of academic subjects. (Thanks to Thomas Landauer for making this data available for research purposes.)

The second set of similarity scores was created using an RI model with similar parameters as those used for the CVA model. The Random Indexing model used co-occurrence of words within the same document in the TASA corpus as the basis for dimensionality reduction, and also used the TASA corpus to estimate inverse document frequency values for individual terms. Document vectors were produced as the tf*idf-weighted sum of term vectors occurring within the document, again with log weighting of both term frequencies and inverse document frequencies.

For each of these methods, cosine was used as the similarity metric.

FIGS. 1A and 1B show scatterplots of the similarity scores calculated by these methods for the Lexile data set against the variable gTypes, which is the geometric mean of the number of word types in the two documents to be compared. (The geometric mean of the number of word types was found to correlate more strongly with CVA and RI similarity scores than either the arithmetic or harmonic means.) A strong positive correlation is obvious for both CVA and RI similarity scores, with the relationship between RI similarity and gTypes approximately log-linear. (The Pearson product-moment correlation between CVA similarity and gTypes is 0.86, while the correlation between RI similarity and log(gTypes) is 0.89.)

In fact, this dependency of similarity on length is not primarily related to the discourse structure of longer texts vs. shorter texts, or anything specific to the order of words in the text at all, as is shown by a second experiment. A second collection of 400 documents (the LM data set) was generated as random collections of words, according to a unigram language model probability distribution based on the frequencies of words in the TASA corpus. The lengths of these documents were chosen to span the range of approximately 0-15,000 word tokens. As FIG. 2 demonstrates, the similarity scores between these randomly composed documents show almost exactly the same correlation with text length as observed with the fiction texts from Lexile. (On the LM data set, the correlation between CVA similarity and gTypes is 0.92, while the correlation between RI similarity and log (gTypes) is 0.94.)

The CVA and RI vectors corresponding to a document are constructed as the sum of vectors for the terms they contain, and these words only represent a sample from the vocabulary distribution which is representative of the meaning of the document in question. For the random documents in the LM data set, the distribution which is approximated in each document is the unigram distribution from which each document was constructed. As the documents increase in length, the law of large numbers indicates that their semantic vectors will converge to the mean vector of the distribution, and therefore that the similarity between vectors will converge to sim($\vec{d}_{mean}, \vec{d}_{mean}$), which in the case of cosine similarity equals 1. Even when the documents are not randomly composed, it can be assumed that document topics are not so sharply delimited in terms of their vocabulary that the vectors for two different documents will tend to converge to orthogonal vectors as they increase in length. Indeed, the results on the Lexile data set indicate that, at least for these texts, there is a large amount of general-purpose vocabulary that is common across topics, and causes document vectors to converge to a similar mean vector as they get longer. In fact, these observations hold even for methods in which the vector representing a document is not simply defined as a sum of term vectors (such as LSA). In any case, the vectors for longer documents will be more stable, whereas vectors for shorter documents will tend to vary more from that expected for a document on that topic.

This confounding of semantic similarity with length is pernicious in a number of natural language processing (NLP) applications. When these similarity scores are used as features for making predictions in applications such as text categorization (Cardoso, Cachopo, & Oliveira 2003) and document clustering (Liu et al. 2005), they are intended as measures of the topical similarity of documents, and not document length. When document length is also relevant to the task, it may be added to the model as an additional feature, but keeping conceptually distinct features independent in the model is likely to result in higher classification accuracy. Another issue is that classification accuracy is not the only criterion to be optimized in many NLP applications using semantic similarity features—in some tasks, such as automatic essay grading (Burstein 2003; Attali & Burstein 2006; Landauer, Laham, & Foltz 2003), there is an additional requirement of validity, that scores be determined on the basis of features which are plausibly related to student performance. Assigning essay scores on the basis of the relatedness of an essay to a particular topic clearly involves different claims about the writing process than assigning scores based on the length of the essay.

Pivoted Normalization

The 1990s marked a realization in the information retrieval community that the relevance rankings produced by standard metrics interacted with the length of indexed documents in a way which could be exploited to improve performance. In particular, as shown by Singhal, Buckley & Mitra (1996), the relevance of longer documents tends to be underestimated by metrics such as the cosine similarity between the document and the query, whereas the relevance of shorter documents tends to be overestimated. The method proposed by these authors to address this disparity, which has gained wide currency in the intervening decade, is known as pivoted document length normalization.

Singhal et al. begin with the observation that the foundation for many IR relevance measures is the dot product of a document vector with a query vector ($\vec{d} \cdot \vec{q}$), which is then divided by a normalization term to account for two effects of longer documents: the greater number of terms, and the higher frequency of terms within the document. Common normalization terms include the cosine normalization $\|\vec{d}\|$ and the number of word types in the document.

As previously mentioned, however, this normalization does not perfectly account for the effects of document length, since long documents are still deemed relevant less often than would be expected based on human judgments, and the converse is true for short documents. To rectify this problem, Singhal et al. introduce a linear transformation of the normalization term used in calculating relevance estimates:

$$NewNormalization = (1.0 - s) + s \times \frac{OldNormalization}{AverageOldNormalization}$$

The parameter s is a slope parameter determining the magnitude of the change in the normalization term for a document of a given length, and can be determined on the basis of a set of documents with human relevance judgments, in order to minimize the discrepancy between documents' probability of relevance and probability of retrieval. Given a slope value between 0 and 1, the normalization term will be decreased for documents whose length is greater than the average value (the pivot which will cause their relevance estimates to be increased. FIG. 3A, modified from Singhal et al. (1996), illustrates the shift in retrieval probabilities which pivoted normalization is intended to yield.

Earlier work using vector-space methods of semantic similarity calculation for NLP tasks has taken note of the confounding effect of document length only sporadically and in passing. In work on the automated scoring of essays, in which features based on vector-space techniques are commonly used, some authors have calculated partial correlations of these features with essay scores given the length of the essay, because the length of the essay is well known to be a strong predictor of essay scores (Page, 1968).

Similarly, Penumatsa et al. (2006) note that the average LSA similarity score between student answers and model answers increases with the length of the student answer, so that length-dependent threshold values on similarity have to be used in assessing how close a student's answer is to the desired response.

Finally, Higgins (2007) does take note of the confound of essay length with similarity for vectors in a Random Indexing space (in the course of developing a model of student essay coherence), but does not recognize that this is a more general problem holding of all vector-space techniques.

SUMMARY

Disclosed herein is a computer-implemented method, system, and computer program product for generating vector-based similarity scores in text document comparisons considering the confounding effect of document length. Embodiments of the present invention input two text documents to be compared, and compute the geometric mean of the number of word types of the two text documents. A similarity score is then computed, preferably with a Random Indexing model though a Content-Vector Analysis model or Latent Semantic Analysis model or other vector-based similarity model may also be used. The invention then performs a unique pivoted document length normalization on the similarity score, with normalization terms affected by both text documents, and a normalization slope parameter selected to minimize the correlation between document length and a resulting normalized similarity score. The invention may perform pivoting of a joint normalization term, as well as separate pivoting of the normalization component of each of the two text documents. The normalized similarity score is then output to a user. The geometric mean may be replaced by the arithmetic mean or the harmonic mean.

The vector-based similarity model uses co-occurrence of words within a corpus as the basis for dimensionality reduction, with logarithmic term weights and inverse document frequency measures derived from a reference corpus, and document vectors produced as the tf*idf-weighted sum of term vectors occurring within the document. For the Random Indexing model, the normalization slope parameter may be approximately 10, while for the Content-Vector Analysis model the normalization slope parameter may be approximately 5.

BRIEF DESCRIPTION OF THE DRAWINGS

Aspects, features, benefits and advantages of the present invention will be apparent with regard to the following description and accompanying drawings, of which.

DETAILED DESCRIPTION

None of the previously noted work has taken the further step of developing an improved similarity metric based on a vector space, which does not suffer from the document length confound described above. A technique used in information retrieval, though, provides a clue as to how such a metric can be devised.

Figure 1A:
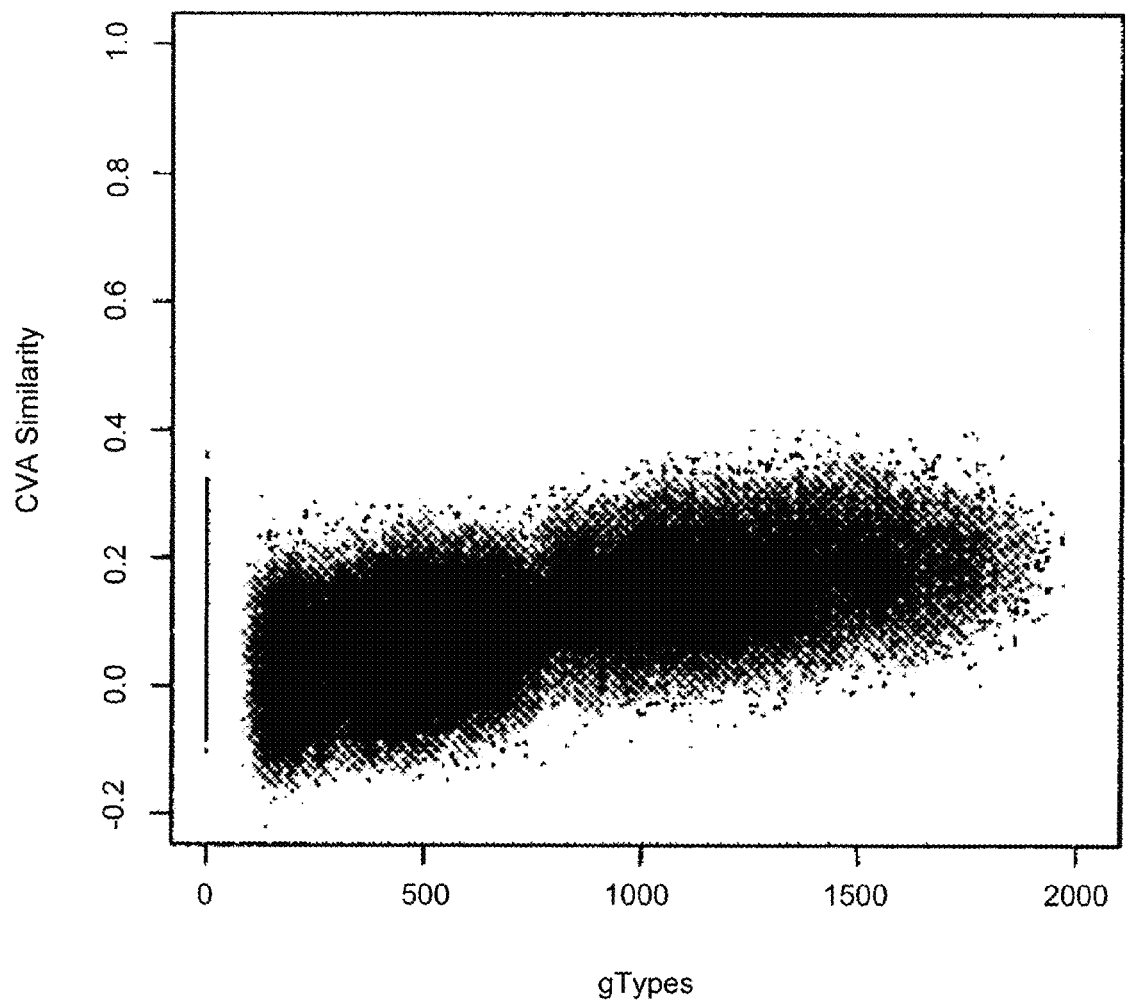
FIG. 1A is a diagram showing the relationship of similarity scores to document length in the Lexile data set.
Figure 1B:
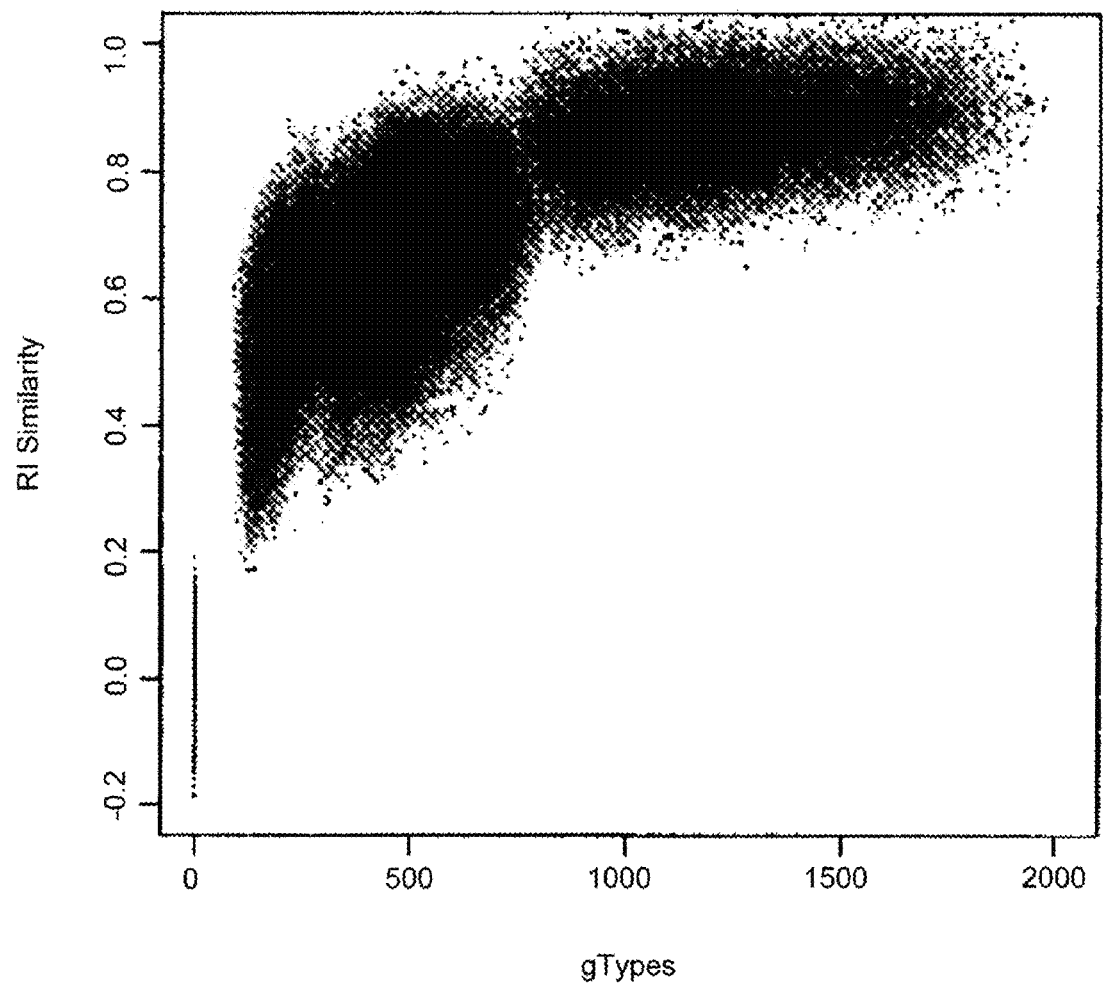
FIG. 1B is a diagram showing the relationship of similarity scores to document length in the Lexile data set.
Figure 2A:
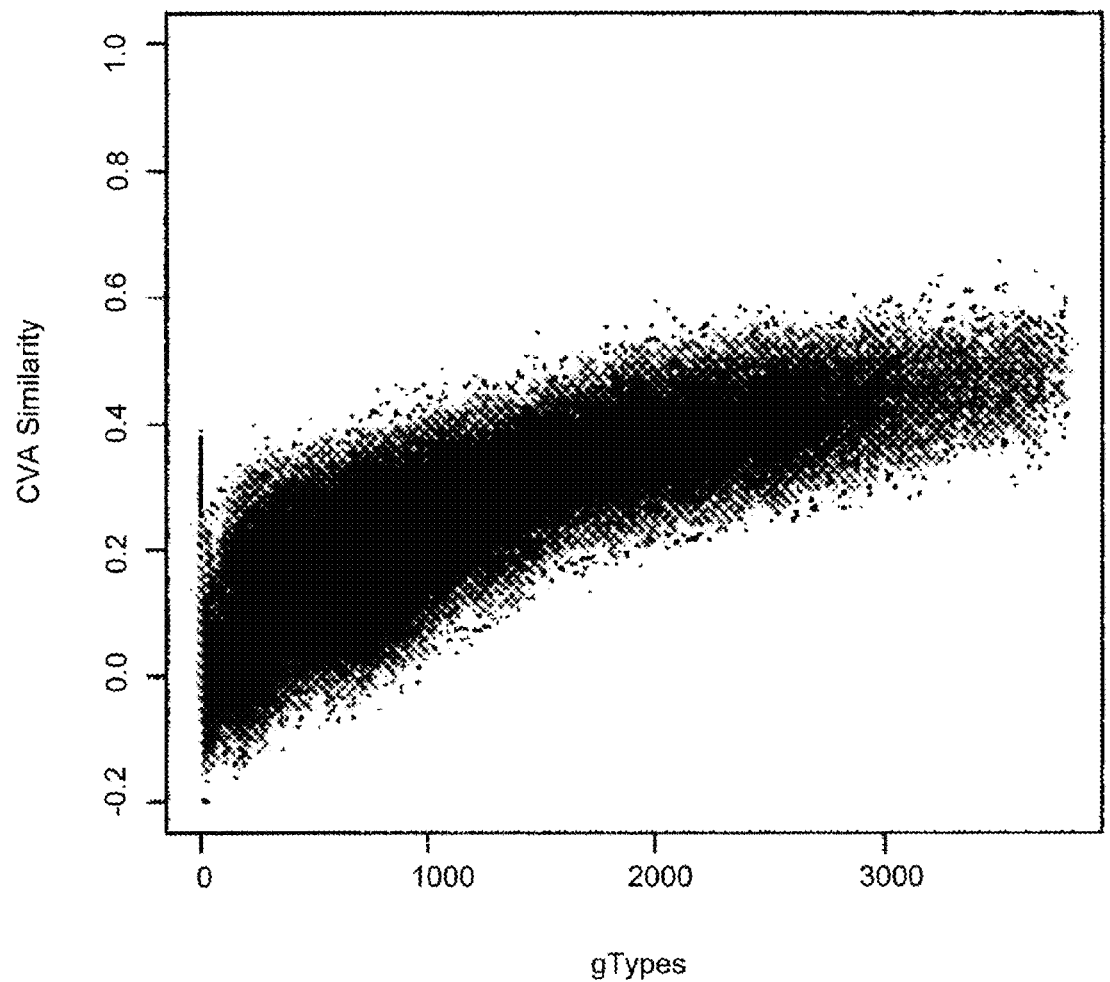
FIG. 2A is a diagram showing the relationship of similarity scores to document length in the Unigram-LM data set.
Figure 2B:
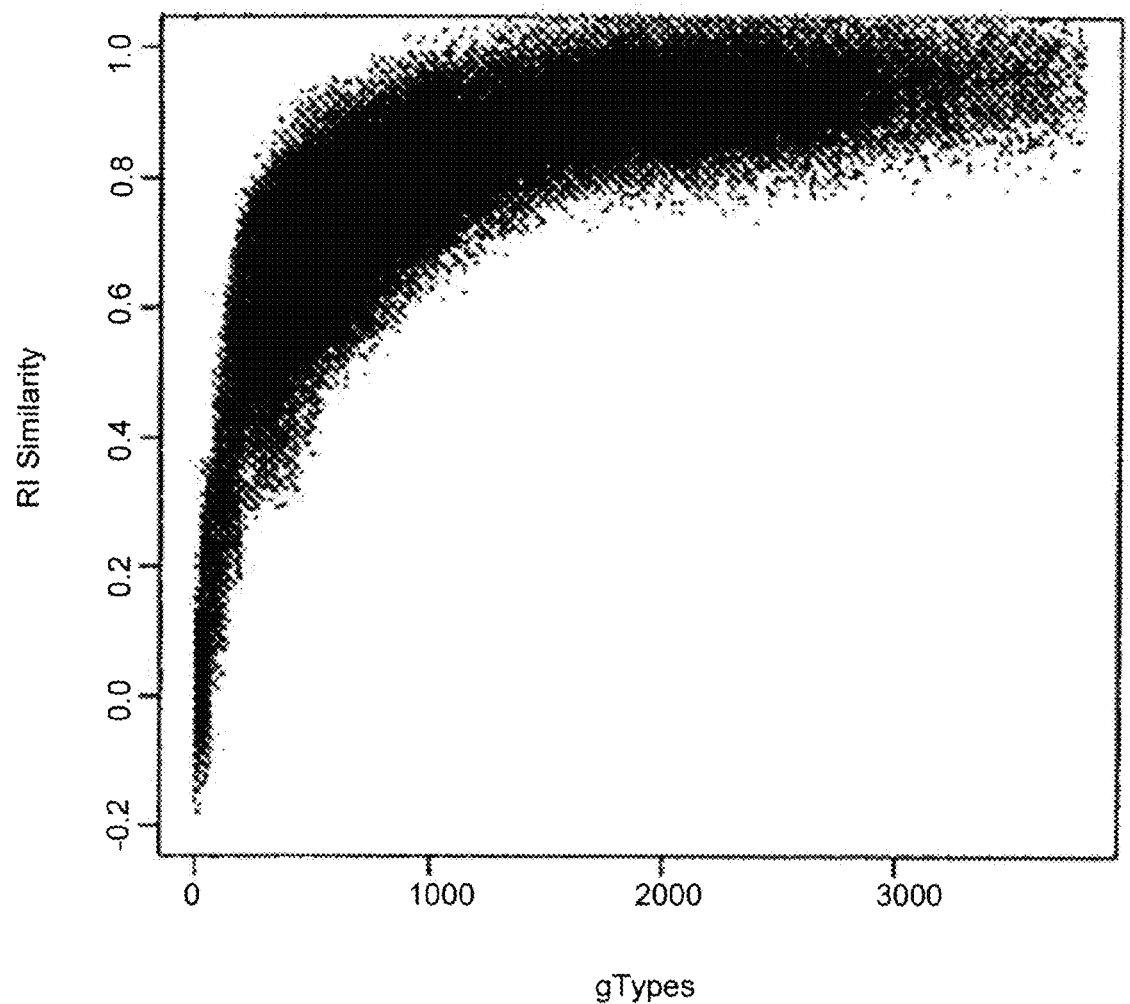
FIG. 2B is a diagram showing the relationship of similarity scores to document length in the Unigram-LM data set.
Figure 3A:
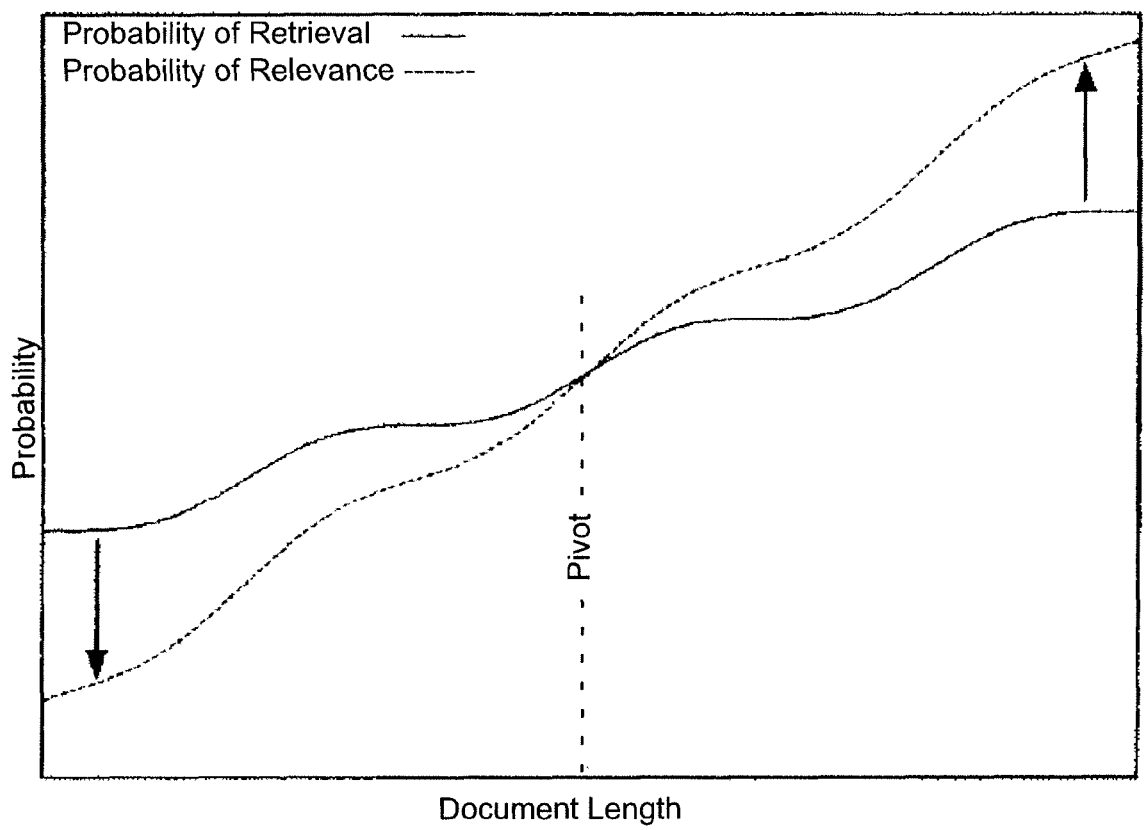
FIG. 3A is a diagram showing the pivoting operation in information retrieval.
Figure 3B:
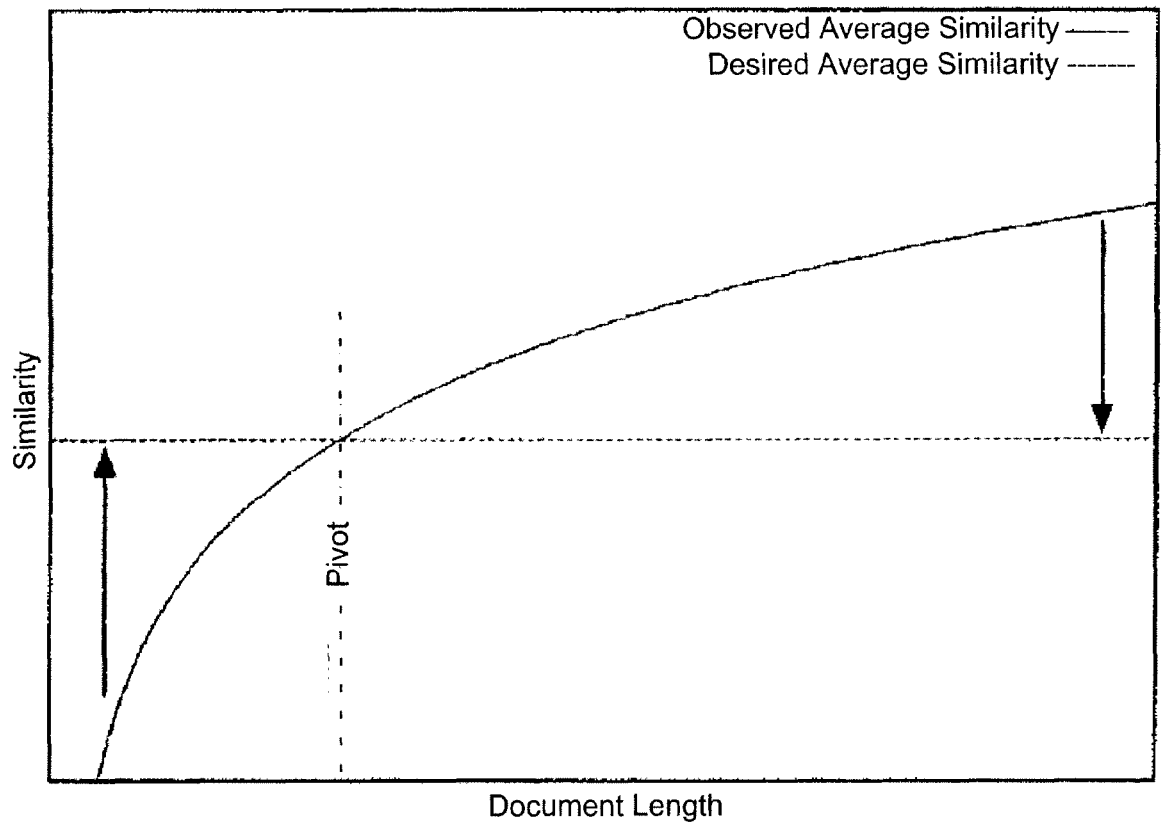
FIG. 3B is a diagram showing the pivoting operation to correct for the confounding effect of text length according to a preferred embodiment.

The present invention proposes to use a variation of the technique of Singhal et al. (1996) to modify the semantic similarity scores used in natural language processing applications. The main differences from the IR scenario are that the normalization terms will be affected by both documents being compared (whereas only the length of the indexed document is considered in the IR case), and that the slope parameter is tuned to optimize a different objective function. Rather than minimizing the discrepancy between retrieval and relevance probabilities, the goal in the case of semantic similarity spaces for NLP is to minimize the correlation between document length and the resulting similarity measure. FIG. 3B illustrates the way in which pivoted normalization is intended to rectify the dependence of semantic similarity estimates on document length. Note that in this application, we observe similarity scores for long documents which are generally too high, rather than too low, so that the slope value s will take on a value greater than 1 in this application of pivoted normalization.

Evaluation

To evaluate the effect of using pivoted normalization to correct for the confounding effect of document length in vector-based semantic similarity metrics, experiments were conducted on two publicly-available text categorization data sets. The hypothesis to be tested in this evaluation is that providing the classifier with a length-independent measure of semantic similarity will improve performance, because the effects of document length and semantic similarity of vocabulary can be treated independently of one another.

In each of the experiments below, the text categorization task was addressed using the J48 decision tree classifier from the Weka machine learning toolkit (Witten & Frank 2005), a reimplementation of the C4.5 classifier (Quinlan 1996). The features used in training the classifier were the semantic similarity between the document and the set of training documents belonging to a given topic (one feature for each topic), and the number of word types found in the document to be classified (a measure of document length). This specification of the task differs from common practice in text categorization, in which each word is treated as an independent feature available to the classifier (e.g., Gabrilovich & Markovitch 2004), and is designed only as a test case for comparing the usefulness of different semantic similarity measures.

The results provided below were produced using 10-fold cross-validation within the evaluation set.

Data

The TechTC data set (Davidov, Gabrilovich, & Markovitch 2004) is actually a collection of 100 different test sets for text categorization, each consisting of a set of positive and negative exemplars of a topic. These documents were automatically acquired from the Web, and the topics correspond to Open Directory (www.dmoz.org) categories. For the experiments reported here, half of the positive exemplars and half of the negative exemplars were used as the test data for each set, and the remaining exemplars of each type were used to produce the topic vectors to which the test documents were compared. The accuracy statistics reported below reflect the average classification accuracy observed over all 100 topics in the TechTC set.

The Reuters-21578 Text Categorization Collection (Lewis 2007) is a widely used set of Reuters newswire articles, categorized into seven topics. In the experiments described below, the "modified Apté" split (Apté, Damerau, & Weiss 1994a; 1994b) was used to select documents for use in training (in this case, defining topic vectors) and in evaluation. Documents labeled as belonging to multiple categories were excluded from the evaluation.

Results

The evaluation experiments were carried out for both CVA and RI similarity scores, using either the standard cosine normalization term or gTypes (the geometric mean of the number of word types in the documents compared). For each of these metrics, a version using pivoted normalization was also considered. In independent experiments using a variety of test corpora, it was determined that the optimal slope parameters for this application did not vary greatly by training corpus. Therefore, the slopes used in applying pivoted normalization were s=5.0 for CVA, and s=10.0 for RI, values close to the optimal ones.

As Table 1 shows, with reference to the Lexile and LM data sets introduced earlier, the use of pivoted normalization effectively addresses the conflation of semantic similarity with length. For each type of similarity measure, the version using pivoted normalization has a negligible correlation with gTypes.

Table 2 shows the text classification accuracy of each semantic similarity metric on the Reuters and TechTC data sets. When pivoted normalization is not used, the models using CVA features are more accurate than those using Random Indexing (by a wide margin), and the standard cosine normalization of the similarity scores performs slightly better than the normalization by gTypes.

TABLE 1

Correlations between similarity scores and document length
(gTypes in the case of CVA, log(gTypes) for Random Indexing)

|  |  |  | Cosine Normalization | Types Normalization |
|---|---|---|---|---|
| Unigram LM | RI | Standard | 0.939 | 0.841 |
|  |  | Pivoted | 0.008 | 0.013 |
|  | CVA | Standard | 0.924 | 0.973 |
|  |  | Pivoted | 0.006 | 0.006 |
| Lexile | RI | Standard | 0.893 | 0.764 |
|  |  | Pivoted | 0.002 | 0.000 |
|  | CVA | Standard | 0.859 | 0.912 |
|  |  | Pivoted | 0.000 | 0.010 |

TABLE 2

Results on text classification tasks

|  |  |  | Cosine Normalization | Types Normalization |
|---|---|---|---|---|
| Reuters | RI | Standard | 60.35% | 58.96% |
|  |  | Pivoted | 83.94% | 87.56% |
|  | CVA | Standard | 85.95% | 83.89% |
|  |  | Pivoted | 73.79% | 83.57% |
| TechTC | RI | Standard | 51.86% | 51.23% |
|  |  | Pivoted | 53.04% | 62.69% |
|  | CVA | Standard | 58.41% | 56.80% |
|  |  | Pivoted | 58.26% | 56.58% |

When pivoted normalization is applied, however, these generalizations do not hold. In fact, the best-performing model on both data sets is the one using RI similarity scores normalized by gTypes. The generally superior accuracy of models using normalization by gTypes, among those using pivoted normalization, replicates the finding of Singhal, Buckley & Mitra 1996 that pivoted normalization tends to work better when combined with a similarity metric normalized by a direct measure of document length, rather than using the standard cosine normalization.

Comparing the models using pivoted normalization to the standard models, those based on RI similarity scores uniformly show a significant performance improvement when pivoted normalization is applied ($p<0.05$ or better in all cases). The models based on CVA similarity scores, though, show a degradation in performance which is insignificant in most cases, but dramatic in the case of CVA similarities with cosine normalization on the Reuters data set ($p<0.01$). The improvement in classification accuracy from the best model without pivoted normalization to the best model with pivoted normalization is significant for both data sets ($p<0.05$ for Reuters, $p<0.01$ for TechTC).

Discussion

The significant improvement in classification performance observed for the version of Random Indexing using pivoted types-normalization demonstrates that this technique can contribute to the performance of NLP applications using vector-based similarity scores. The pivoted version of the Random Indexing similarity scores provide a conceptually purer representation of the degree to which two documents contain terms similar in meaning, which is more useful in the text categorization tasks used here, and presumably in other NLP tasks as well.

A somewhat surprising result is the failure to demonstrate a comparable increase in performance when pivoted normalization is used to calculate CVA similarity scores. One explanation for this could be based in the fact that the text categorization tasks used in this paper depend strongly on the exact words found in each document, rather than just general semantic orientation. This is witnessed by the fact that, of the metrics not using pivoted normalization, the CVA-based metrics in Table 2 demonstrate the highest performance, and by the fact that it is common practice to use specific words as predictive features for this application. Given this, the use of pivoted normalization may degrade the performance on text classification tasks when applied to CVA features because it obscures the degree to which two documents contain exactly the same words: long documents with many words in common with the topic vector will have their similarity scores depressed by the technique (because of the presumption that some of this overlap is simply a coincidental artifact of their length), while shorter documents with fewer terms in common with the topic vector will have their similarity scores increased. This problem does not arise in applying pivoted normalization to RI similarity scores, because this method does not provide a direct measure of term overlap in the first place.

Note that the Random Indexing and Content-Vector Analysis models used in the experiments described above are exemplary and not limiting. Embodiments that employ other vector-based similarity calculation techniques are also within the scope of the present invention. The different behavior of pivoted normalization when applied to CVA models and RI models was attributed in the discussion above to the fact that Random Indexing spaces involve dimensionality reduction, which suggests that other reduced-dimensionality techniques like LSA may also be used.

Future Work

This work covers only a portion of the NLP domain affected by the confounding of semantic similarity with document length. An important direction for future work will be to demonstrate that the same improvement which pivoted normalization exhibits for Random Indexing on these text categorization tasks is also demonstrated for different vector-space techniques and NLP problems. The effectiveness of vector-space methods using pivoted normalization should be tested on additional tasks, such as document clustering and the automated scoring of essays.

Another open area for future exploration is the use of other methods for addressing the confound of document length. While the pivoted normalization method has become widely used in information retrieval, certainly other ways of addressing the problem are conceivable (such as the vector translation method suggested by Higgins (2007)).

Conclusion

While the particular SYSTEM AND METHOD FOR HANDLING THE CONFOUNDING EFFECT OF DOCUMENT LENGTH ON VECTOR-BASED SIMILARITY SCORES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one", not "only one", unless otherwise stated in the claim.

All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

All publications mentioned herein are incorporated by reference in their entireties. Nothing herein is to be construed as an admission that the embodiments described herein are not entitled to antedate such disclosure by virtue of prior invention. As used herein, the term "comprising" means "including, but not limited to."

The invention is a general purpose computer programmed according to the inventive steps herein. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein. The invention is also a computer-implemented method for undertaking the acts disclosed.

REFERENCES

Apté, C.; Damerau, F.; and Weiss, S. M. 1994a. Automated learning of decision rules for text categorization. *ACM Trans. Inf. Syst.* 12(3):233-251.

Apté, C.; Damerau, F.; and Weiss, S. M. 1994b. Towards language independent automated learning of text categorization models. In *SIGIR '94: Proceedings of the 17th annual international ACM SIGIR conference on Research and development in information retrieval*, 23-30. New York, N.Y., USA: Springer-Verlag New York, Inc.

Attali, Y., and Burstein, J. 2006. Automated essay scoring with e-rater v.2. *The Journal of Technology, Learning and Assessment (JTLA)* 4(3).

Baayen, H. R. 2001. *Word Frequency Distributions*, volume 18 of *Text, Speech and Language Technology*. Springer.

Burstein, J. 2003. The e-rater scoring engine: Automated essay scoring with natural language processing. In Shermis, M. D., and Burstein, J., eds., *Automated Essay Scoring: A Cross-disciplinary Perspective*. Hillsdale, N.J.: Lawrence Erlbaum Associates, Inc.

Cardoso-Cachopo, A., and Oliveira, A. L. 2003. An empirical comparison of text categorization methods. In *SPIRE 2003-Tenth Symposium on String Processing and Information Retrieval*, LNCS, 183-196. Springer-Verlag.

Davidov, D.; Gabrilovich, E.; and Markovitch, S. 2004. Parameterized generation of labeled datasets for text categorization based on a hierarchical directory. In *Proceedings of the 27th annual international Conference on Research and Development in Information Retrieval*, 250-257.

Deerwester, S. C.; Dumais, S. T.; Landauer, T. K.; Furnas, G. W.; and Harshman, R. A. 1990. Indexing by latent semantic analysis. *Journal of the American Society of Information Science* 41(6):391-407.

Gabrilovich, E., and Markovitch, S. 2004. Text categorization with many redundant features: using aggressive feature selection to make SVMs competitive with C4.5. In *ICML '04: Proceedings of the twenty-first international conference on Machine learning*, 41. New York, N.Y., USA: ACM.

Higgins, D. 2007. Sentence similarity measures for essay coherence. In *Proceedings of the Seventh International Workshop on Computational Semantics (IWCS-7)*.

Kanerva, P.; Kristoferson, J.; and Holst, A. 2000. Random indexing of text samples for latent semantic analysis. In Gleitman, L. R., and Josh, A. K., eds., *Proc. 22nd Annual Conference of the Cognitive Science Society*.

Landauer, T. K., and Dumais, S. T. 1997. A solution to Plato's problem: The latent semantic analysis theory of acquisition, induction, and representation of knowledge. *Psychological Review* 104:211-240.

Landauer, T. K.; Laham, D.; and Foltz, P. W. 2003. Automated scoring and annotation of essays with the intelligent essay assessor. In Shermis, M. D., and Burstein, J., eds., *Automated essay scoring: A cross-disciplinary perspective*. Hillsdale, N.J.: Lawrence Erlbaum Associates, Inc. 87-112.

Lewis, D. 2007. Reuters-21578 text categorization collection, distribution 1.0, daviddlewis.com/resources/testcollections/reuters21578/.

Liu, Y.-F.; Qi, H.; Hu, X.-E.; Cai, Z.-Q.; Dai, J.-M.; and Zhu, L. 2005. Application of LSA space's dimension character in document multi-hierarchy clustering. In *Proceedings of the 2005 International Conference on Machine Learning and Cybernetics*, 2384-2389.

Page, E. B. 1968. The use of the computer in analyzing student essays. *International Review of Education* 14(2):210-225.

Penumatsa, P.; Ventura, M.; Graesser, A. C.; Louwerse, M. M.; Hu, X.; Cai, Z.; and Franceschetti, D. R. 2006. The right threshold value: What is the right threshold of cosine measure when using latent semantic analysis for evaluating student answers? *International Journal on Artificial Intelligence Tools* 15(5):767-778.

Quinlan, J. 1996. Improved use of continuous attributes in C4.5. *Journal of Artificial Intelligence Research* 4:77-90.

Sahlgren, M. 2001. Vector based semantic analysis: Representing word meanings based on random labels. In *Proceedings of the ESSLLI 2001 Workshop on Semantic Knowledge Acquisition and Categorisation*.

Sahlgren, M. 2006. *The Word-Space Model: Using distributional analysis to represent syntagmatic and paradigmatic relations between words in high-dimensional vector spaces*. Ph.D. Dissertation, Stockholm University.

Salton, G., and McGill, M. J. 1983. *Introduction to Modern Information Retrieval*. McGraw Hill.

Singlal, A.; Buckley, C.; and Mitra, M. 1996. Pivoted document length normalization. In *Research and Development in Information Retrieval*, 21-29.

Witten, I. H., and Frank, E. 2005. *Data Mining: Practical Machine Learning Tools and Techniques*. Morgan Kaufmann Series in Data Management Systems. Morgan Kaufmann, second edition.

What is claimed is:

1. A computer-implemented method of generating vector-based similarity scores in text document comparisons considering document length, comprising:
   computing a mean of a number of word types of two text documents to be compared;
   determining a similarity score with a vector-based similarity model, wherein the vector-based similarity model is a Random Indexing model and wherein a normalization slope parameter has a value of 10;

performing pivoted document length normalization on the similarity score using the mean of the number of word types of the two text documents as a normalization affected by both text documents and using the normalization slope parameter; and outputting a normalized similarity score.

2. A computer-implemented method of generating vector-based similarity scores in text document comparisons considering document length, comprising:

computing a mean of a number of word types of two text documents to be compared;

determining a similarity score with a vector-based similarity model, wherein the vector-based similarity model is a Content-Vector Analysis model and wherein a normalization slope parameter has a value of 5;

performing pivoted document length normalization on the similarity score using the mean of the number of word types of the two text documents as a normalization affected by both text documents and using the normalization slope parameter; and outputting a normalized similarity score.

3. A computer system for generating vector-based similarity scores in text document comparisons considering document length, comprising:

a computer programmed with instructions that, when executed, cause the computer to execute steps comprising:

computing a mean of a number of word types of two text documents;

determining a similarity score with a vector-based similarity model, wherein the vector-based similarity model is a Random Indexing model and wherein a normalization slope parameter has a value of 10;

performing pivoted document length normalization on the similarity score using the mean of the number of word types of the two text documents as a normalization affected by both text documents and using the normalization slope parameter; and outputting a normalized similarity score.

4. A computer system for generating vector-based similarity scores in text document comparisons considering document length, comprising:

a computer programmed with instructions that, when executed, cause the computer to execute steps comprising:

computing a mean of a number of word types of two text documents to be compared;

determining a similarity score with a vector-based similarity model, wherein the vector-based similarity model is a Content-Vector Analysis model and wherein a normalization slope parameter has a value of 5;

performing pivoted document length normalization on the similarity score using the mean of the number of word types of the two text documents as a normalization affected by both text documents and using the normalization slope parameter; and outputting a normalized similarity score.

5. An article of manufacture comprising a non-transitory computer-readable storage medium for causing a computer to generate vector-based similarity scores in text document comparisons considering document length, said computer readable medium including programming instructions that, when executed, cause the computer to execute steps comprising:

computing a mean of a number of word types of two text documents;

determining a similarity score with a vector-based similarity model, wherein the vector-based similarity model is a Random Indexing model and wherein a normalization slope parameter has a value of 10;

performing pivoted document length normalization on the similarity score using the mean of the number of word types of the two text documents as a normalization affected by both text documents and using the normalization slope parameter; and outputting a normalized similarity score.

6. An article of manufacture comprising a non-transitory computer-readable storage medium for causing a computer to generate vector-based similarity scores in text document comparisons considering document length, said computer readable medium including programming instructions that, when executed, cause the computer to execute steps comprising:

computing a mean of a number of word types of two text documents to be compared;

determining a similarity score with a vector-based similarity model, wherein the vector-based similarity model is a Content-Vector Analysis model and wherein a normalization slope parameter has a value of 5;

performing pivoted document length normalization on the similarity score using the mean of the number of word types of the two text documents as a normalization affected by both text documents and using the normalization slope parameter; and outputting a normalized similarity score.

* * * * *